US009515851B1

United States Patent
Dhakal et al.

(10) Patent No.: US 9,515,851 B1
(45) Date of Patent: Dec. 6, 2016

(54) REDUCED DIMENSION TIME DOMAIN CHANNEL ESTIMATION IN A WIRELESS COMMUNICATION NETWORK

(71) Applicant: Collision Communications, Inc., Portsmouth, NH (US)

(72) Inventors: Sagar Dhakal, Bedford, NH (US); Sayak Bose, Nashua, NH (US); Joseph Farkas, Merrimack, NH (US); Brandon Hombs, Merrimack, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 0 days.

(21) Appl. No.: 14/723,576

(22) Filed: May 28, 2015

(51) Int. Cl.
*H04L 27/28* (2006.01)
*H04L 25/02* (2006.01)
*H04L 5/00* (2006.01)

(52) U.S. Cl.
CPC ......... *H04L 25/0256* (2013.01); *H04L 5/0007* (2013.01); *H04L 5/0098* (2013.01)

(58) Field of Classification Search
CPC ............... H04L 27/2647; H04L 5/0007; H04L 25/03038; H04L 25/0256; H04W 64/00
USPC 375/260, 232, 267, 346, 347, 349; 370/232, 335
See application file for complete search history.

(56) References Cited

U.S. PATENT DOCUMENTS

2014/0334530 A1* 11/2014 Thompson .......... H04L 25/0212 375/232
2015/0189617 A1* 7/2015 Uchida ................. H04W 64/00 455/456.1

OTHER PUBLICATIONS

Sanzi, F., et al., "A Comparative Study of Iterative Channel Estimators for Mobile OFDM Systems," IEEE Transactions on Wireless Communications, vol. 2, No. 5, pp. 849-859, Sep. 2003.
Song, X., et al., "Improved Channel Estimation Algorithm Based on Parallel Interference Cancellation," 2008 International Conference on Neural Networks and Signal Processing, Jun. 7-11, 2008, Nanjing, pp. 466-469.
Otnes, R., et al., "Iterative Channel Estimation for Turbo Equalization of Time-Varying Frequency-Selective Channels," Wireless Communications, IEEE Transactions, vol. 3, Issue 9, pp. 1918-1923, Nov. 2004.
Wild, T., et al., "Multil-Stage Channel Estimation Across Multiple Cells in Uplink Joint Reception," IEEE 77th Vehicular Technology Conference (VTC Spring) Jun. 2-5, 2013, pp. 1-6.
(Continued)

*Primary Examiner* — Khai Tran

(57) ABSTRACT

Methods and systems for obtaining improved joint channel estimates for a multi-user, frequency-multiplexed data transmission such as SC-FDMA or OFDM begins by estimating separate contributions of users (and/or other signal sources) to the received signal based on joint frequency domain channel estimates. A reduced data set is obtained by subtracting contributions of one or more users from the received data, leaving only the estimated contributions of the remaining users, with noise and residual estimation error signal. Time domain joint channel estimation is then performed on the reduced data set, which is feasible because the number of users has been reduced. In exemplary embodiments, the reduced data set includes only one estimated user contribution. This process is repeated to obtain time domain estimates for all of the users. The method can be repeated by using the TD channel estimates to re-estimate the user contributions and calculate revised TD channel estimates.

30 Claims, 12 Drawing Sheets

(56) References Cited

OTHER PUBLICATIONS

Xue, X., et al., "Multistage Channel Estimation With LMS Parallel Interference Cancellation for Asynchronous DS-CDMA in Frequency-Selective Rayleigh Channels," 6th International IEEE Symposium on Signal Processing and its Applications, vol. 2, pp. 406-409, Aug. 13-16, 2001, Kuala Lumpur.

* cited by examiner

REDUCED DIMENSION TIME DOMAIN CHANNEL ESTIMATION IN A WIRELESS COMMUNICATION NETWORK

FIELD

The subject matter disclosed relates to telecommunications, and more particularly, to methods of channel estimation in a digital telecommunication network.

BACKGROUND

Estimation of the channel conditions between the transmitter and receiver is a necessary step for many communications systems to enable detection and optimal processing of a data stream received from a signal source. So as to enable the necessary channel estimations, most of these systems embed reference symbols in the data stream that are known a priori to the receiver.

In many cases, joint channel estimation techniques are necessitated by the presence of multiple, simultaneous data streams received from multiple signal sources, for example due to multiple access interference (i.e. a plurality of users 100 transmitting a plurality of signals 102 to a base station 104 over the same communication channels, as illustrated in FIG. 1) and/or Multiple Input Multiple Output ("MIMO") multi-path propagation. The need for joint channel estimation can be even greater in a Centralized Radio Access Network ("C-RAN"). These joint channel estimation techniques attempt to obtain multiple channel estimates simultaneously from multiple sources, thereby improving the channel estimation accuracy when the reference symbols from multiple signal sources are not orthogonal.

Computationally efficient linear methods for joint channel estimation are well known, such as the least squares filter or the minimum mean square error filter. These techniques attempt to obtain good channel estimates through modeling the cross correlation between the reference symbols, and by creating a filter to separate them so as to improve the accuracy of the estimates. These filters are computationally simple, and perform adequately in many circumstances.

Typically, the number of reference symbol samples needed for joint channel estimation must be greater than the number of channel estimates to be computed. One approach is to include a plurality of time-separated reference symbol samples in the calculation, under the assumption that the channels are static over relatively short periods of time. In addition, with reference to FIG. 2, in the case of frequency-multiplexed data transmissions, such as Orthogonal Frequency Division Multiplexing ("OFDM") or Single Channel-Frequency Domain Multiple Access ("SC-FDMA") 202 encoded transmissions, in which each data stream of symbols 200 is split into a plurality of sub-streams that are converted to a time domain signal by an Inverse Fast Fourier Transform ("IFFT") 206 and transmitted over frequency-separated "subcarriers," a plurality of reference symbol samples that are frequency-separated across groups of subcarriers can be included in the joint channel estimation. This approach assumes that the channels are "static" over a frequency bandwidth that encompasses a plurality of subcarriers. Note that some or all of the signal sources may not use all of the α subcarriers that are included in the data transmission.

Accordingly, in order to obtain the dimensionality necessary to distinguish a plurality of signals and obtain high quality channel estimates for each of the signal sources, joint channel estimation is often performed over a time/frequency sampling "window" containing reference symbols that are separated from each other in time and/or in frequency. Implicit in this approach is an assumption that the channels do not change significantly over the time dimension and/or the frequency dimension of the "window." This is referred to as the "static channel assumption." Even when the channels are not fully static in time or frequency, this assumption is often sufficiently valid to enable joint channel estimation over a relatively small time/frequency sampling window. However, various issues can arise due to invalidity of these static assumptions, and/or because it is not guaranteed that sufficient dimensionality will be obtained even if the number of reference symbol samples used in the calculation exceeds the number of channel estimates, due to excess correlation of the reference symbol samples and/or of the channels.

With reference to FIG. 3, after receiving signals containing raw time domain data 300 and performing a Fast Fourier transform ("FFT") 302 to separate the subcarriers 304, joint channel estimation 306 of frequency-multiplexed data transmissions is typically performed on the reference symbols 308 in the frequency domain, because it is computationally more efficient to do so. The resulting channel estimates 310 are then used to extract 312 the transmitted symbols 314 from the message data 316.

A joint channel estimation in the time domain instead over the full bandwidth of the received signal 300 would perform better than the frequency domain channel estimation ("FDCE") calculation 306. Current approaches for performing time domain joint channel estimations, however, have been computationally infeasible in practice.

What is needed, therefore, is an improved, computationally feasible method and system for performing time domain joint channel estimations on a frequency-multiplexed data transmission comprising a plurality of simultaneous signals originating from a plurality of signal sources.

SUMMARY

Accordingly, a method and system are described for obtaining computationally feasible time domain joint channel estimates for a frequency-multiplexed data transmission.

The method includes receiving raw time domain data representing a plurality of known reference symbols transmitted over a plurality of frequency-distinct subcarriers by a plurality of signal sources, converting said raw time domain data into frequency domain data, grouping said subcarriers into subcarrier groups, each subcarrier group including K subcarriers, where K is an integer greater than or equal to 1, and using the frequency domain data to jointly calculate frequency domain channel estimates for each of the subcarrier groups and signal sources. A reduced data set is then generated by subtracting an estimated contribution arising from at least one of the signal sources from either the raw time domain data itself, or from a frequency domain representation or other "representative" data that is derived from said raw time domain data, where the estimated contribution is calculated according to the frequency domain channel estimates. Finally, time domain channel estimates are calculated from the reduced data set.

According to exemplary embodiments, the reduced data set is generated by subtracting from the representative data the estimated contributions arising from all of the signal sources, so that only a residual signal and noise remains, and then re-adding at least one of the estimated contributions to the residual signal and noise. In some embodiments, generating the reduced data set includes creating frequency domain channel estimates by subtracting from the frequency domain data an estimated contribution arising from at least one of the signal sources according to the frequency domain channel estimates, and then converting the reduced frequency domain channel estimates into the reduced data set. In other embodiments, generating the reduced data set includes subtracting from the raw time domain data an estimated time domain contribution arising from at least one of the signal sources according to the frequency domain channel estimates.

In some exemplary embodiments, a revised reduced data set is generated by subtracting from the representative data an estimated contribution arising from at least one of the signal sources according to the time domain channel estimates, and calculating revised time domain or frequency domain channel estimates from the revised reduced data set.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Figure 1:
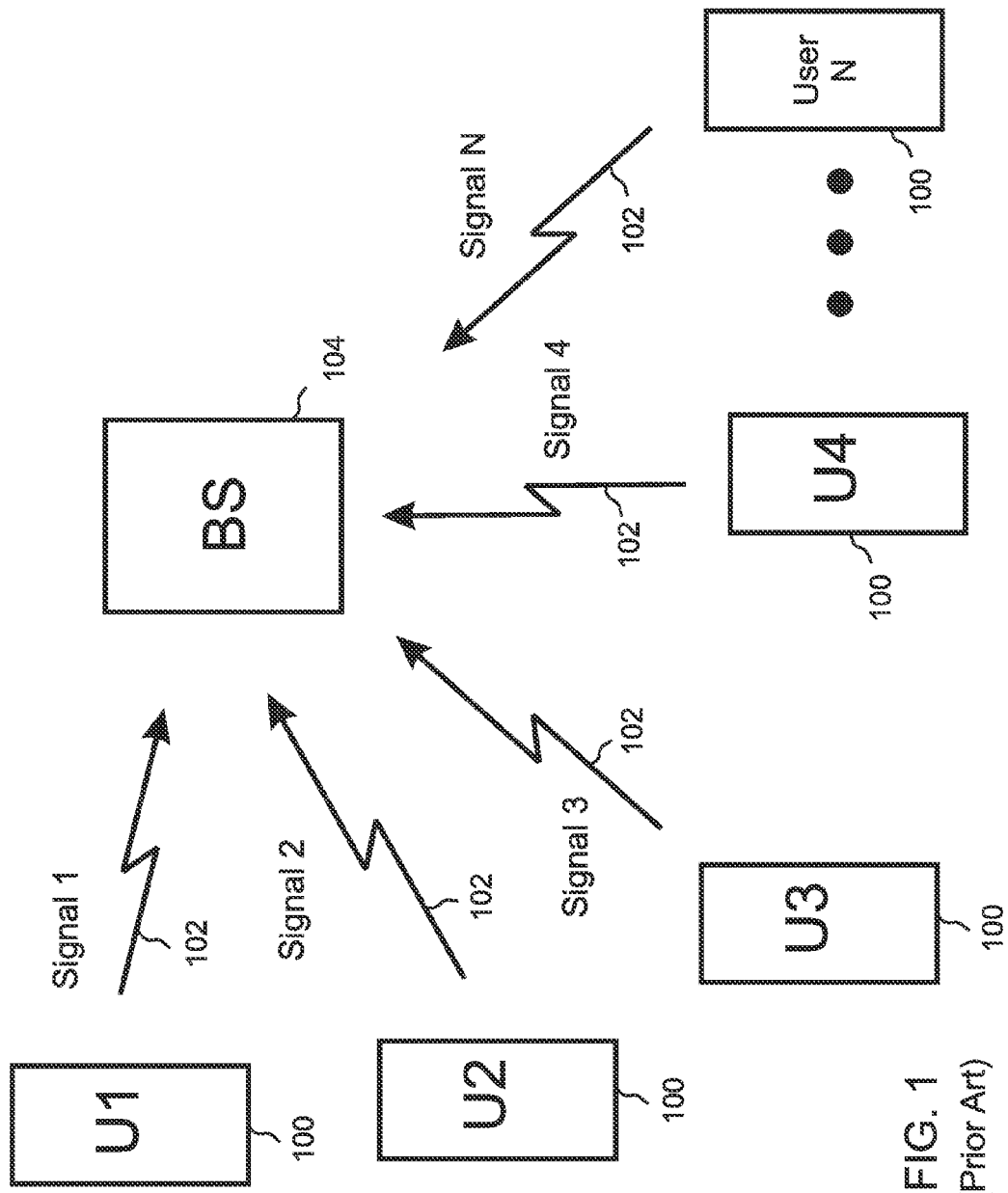
FIG. 1 is a block diagram that illustrates transmitting of signals by a plurality of signal sources to a base station over a shared band of frequencies.
Figure 2:
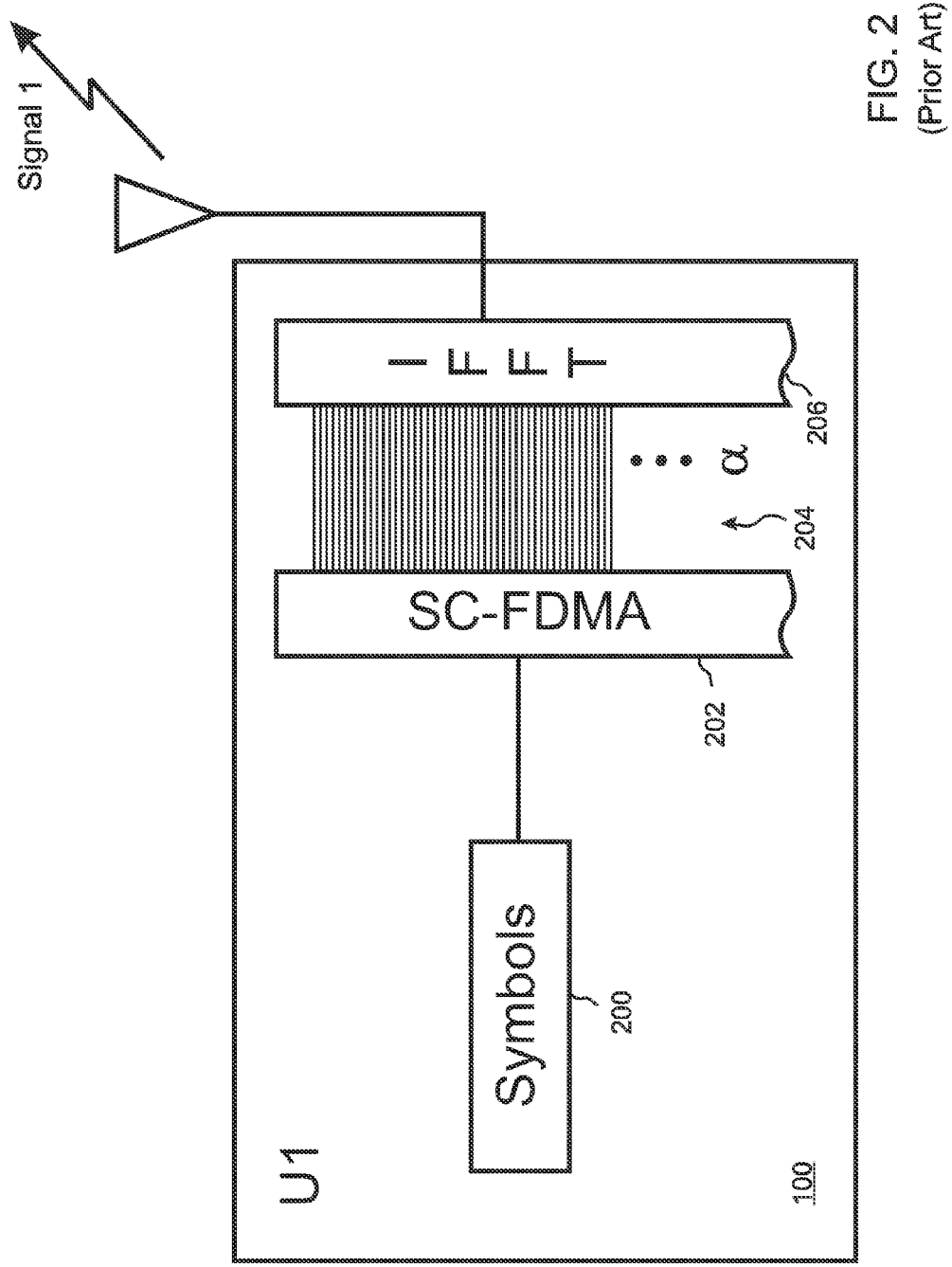
FIG. 2 is a block diagram that illustrates frequency-multiplexed data transmission by a signal source according to a protocol such as OFDM or SC-FDMA.
Figure 3:
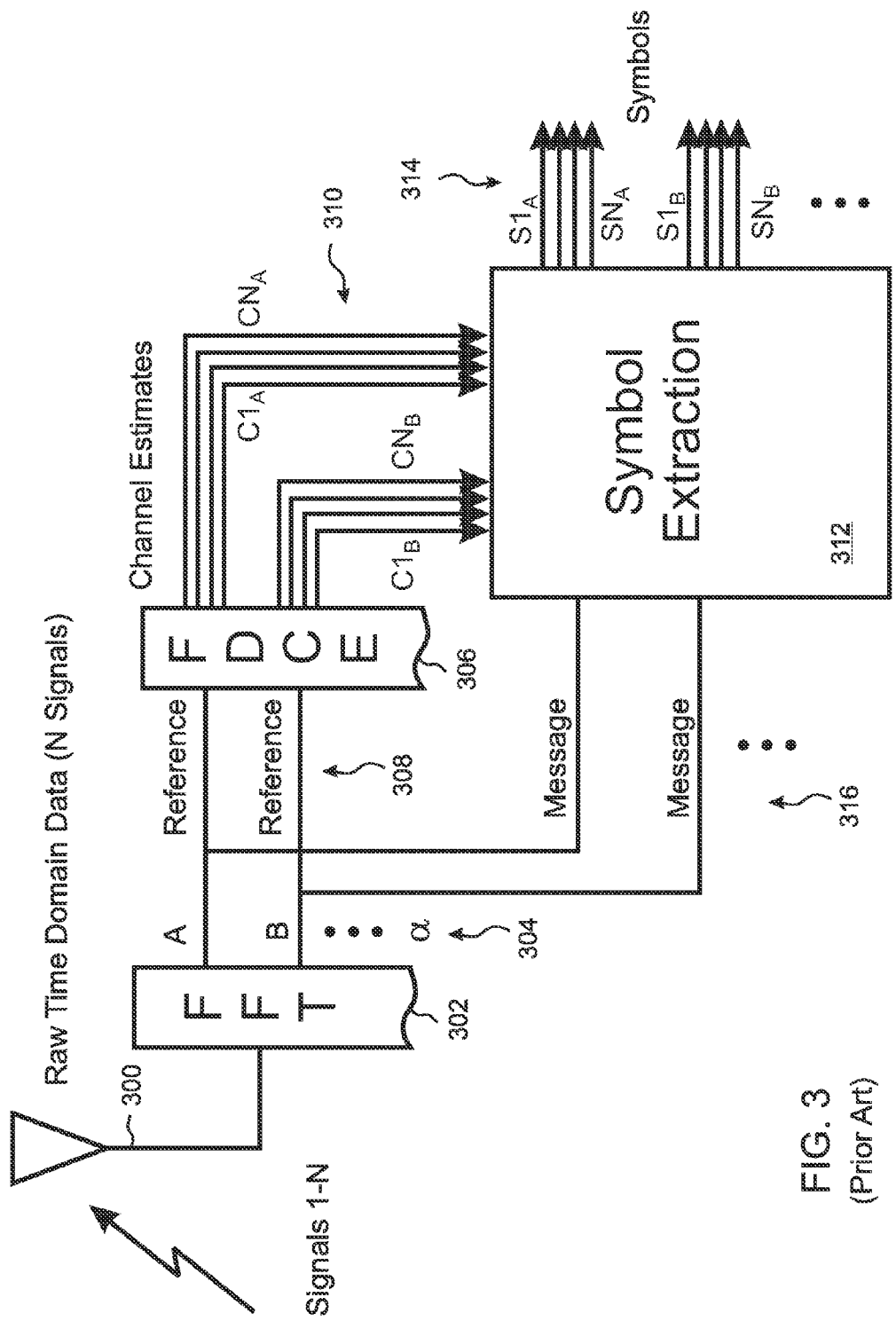
FIG. 3 is a block diagram that illustrates distinguishing and decoding by the base station of the received, multi-user signal of FIG. 1 using frequency domain channel estimates obtained from reference symbols embedded in the transmitted signals.
Figure 4:
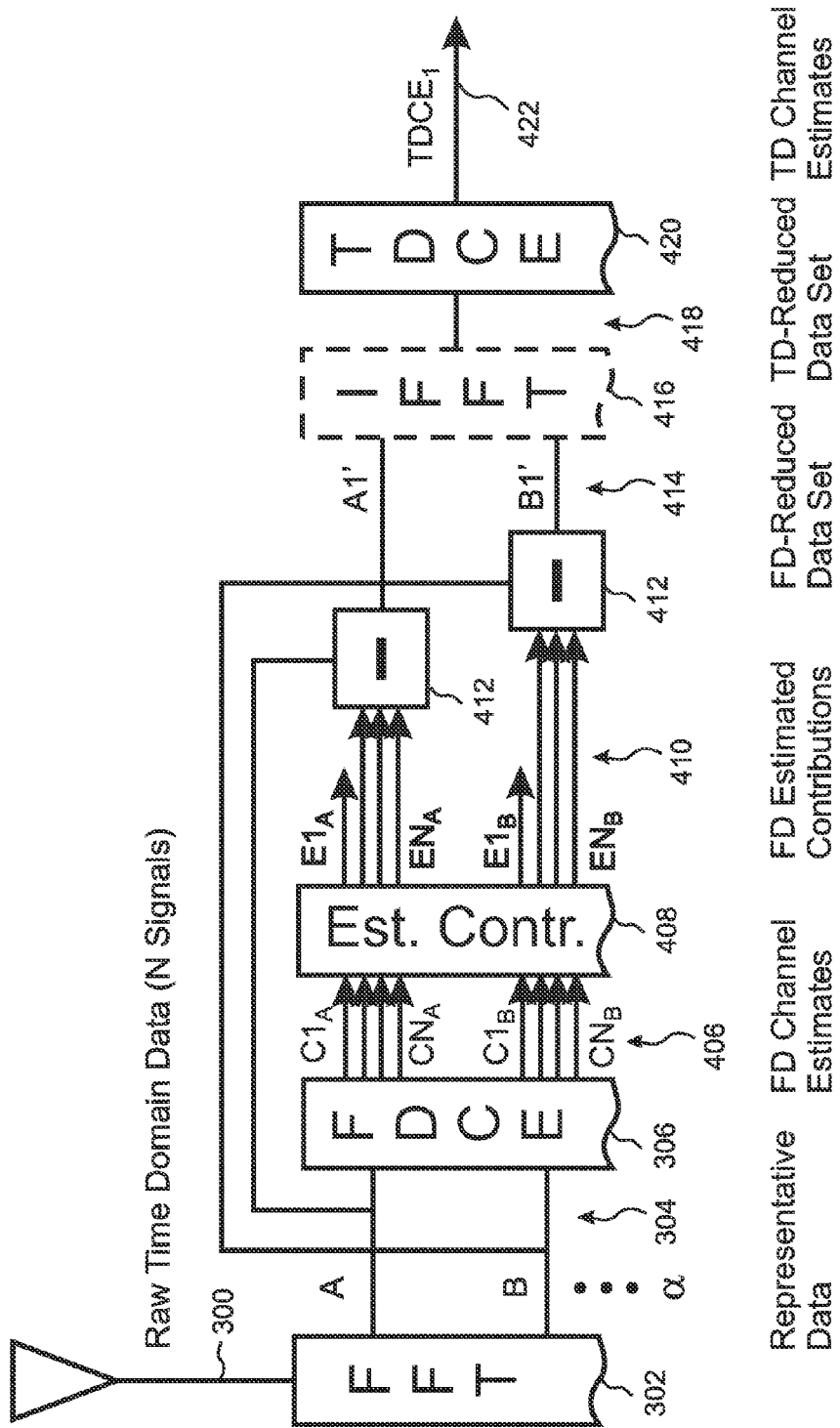
FIG. 4 is a block diagram of an embodiment of the disclosed method in which estimated contributions of all but one of the signal sources are subtracted from a frequency domain representation of the received data before application of time domain channel estimation.

A method and system are described for obtaining computationally feasible, time domain joint channel estimates for a frequency-multiplexed data transmission such as an SC-FDMA transmission or an OFDM transmission in which data is distributed among frequency-distinct subcarriers 204 that are shared by a plurality of signal sources 100. With reference to FIG. 4, the method begins by using a Fourier transform 302 to convert the received raw time domain data 300 into frequency domain data in which the subcarriers 304 (A, B, . . . α) are distinguished from each other. Joint frequency domain channel estimation 306 is then applied to the reference symbols transmitted over the subcarriers 304.

For simplicity of illustration, in FIG. 4 it is assumed that all of the N signal sources 100 transmit over all of the α available subcarriers, and that the frequency domain channel estimation 306 is applied for each of the N signal sources 100 in each of the α subcarriers 304 to obtain N×α channel estimates 406 ([$C1_A$, $C2_A$, . . . $CN_A$]; [$C1_B$, $C2_B$, $CN_B$]; [$Cα_1$, $Cα_2$, $Cα_N$]). These channel estimates 406 are then used to estimate 408 the N×α separate contributions 410 ([$E1_A$, $E1_B$, $E1_N$]; [$E1_B$, $E2_B$, . . . $EN_B$]; . . . [$E1_α$, $E2_α$, . . . $EN_α$]) of each of the N signal sources to each of the subcarriers 304 in the received raw data 300. Note that, in general, the signal sources 100 would not always use all of the α available subcarriers, and the subcarriers may be grouped into subcarrier groups 700 as discussed in more detail below with reference to FIG. 7, so that fewer than N×α channel estimates would be calculated.

After calculating the estimated contributions 410 to the data, a "reduced" time domain data set 414 is calculated by subtracting 412 one or more of the estimated contributions 410 from the received data. In the embodiment of FIG. 4, the full frequency domain estimated contributions 410 of all but one of the signal sources 100 are subtracted 412 from a frequency domain representation 304 of the raw data 300, resulting in a frequency domain reduced data set 414 (A1', B1', . . . α1') that includes only the estimated contribution of one of the signal sources, together with a "residual" component that includes noise and residual signal arising from estimation errors.

Figure 6:
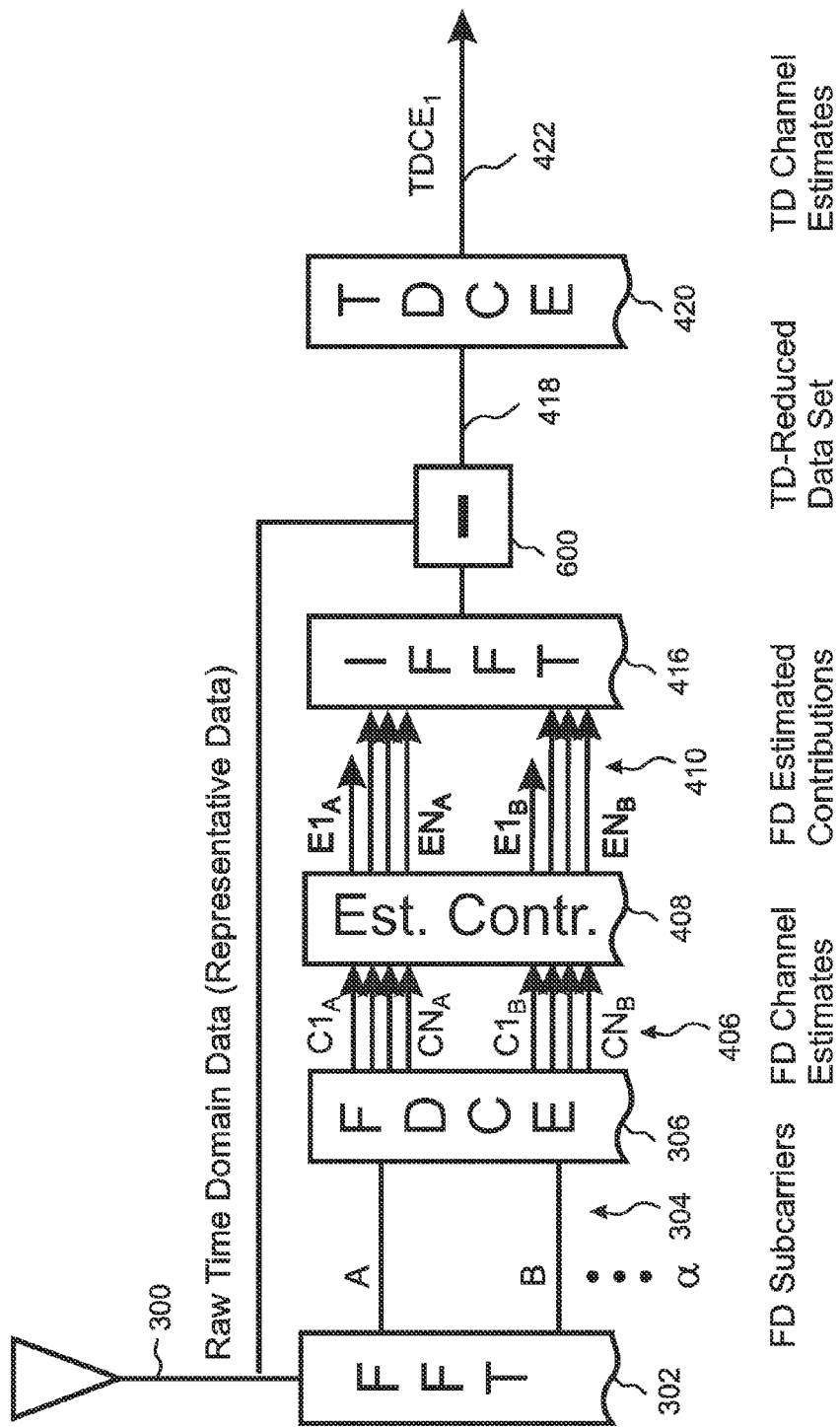
FIG. 6 is a block diagram of an embodiment similar to FIG. 4, wherein a time domain representation of the estimated user contributions is subtracted from the received time domain data before application of the time domain channel estimation.

As discussed in more detail below with reference to FIG. 6, in some embodiments, the frequency domain estimated contributions 410 are converted by an inverse Fourier transform into time domain estimates, which are then subtracted 600 directly from the raw data 300 to obtain the time domain reduced data set 418. In certain embodiments, fractional contributions from one or more of the signal sources 100 are subtracted from the received data. For example, if the signal sources 100 have different channel estimation errors, optimal weighting factors are calculated in some embodiments using statistics of the channel estimates 406, and the residual estimation error in the reduced data set 418 is minimized by subtracting correspondingly weighted, fractional estimated signal source contributions from the received data.

Time domain joint channel estimation 420 is then performed on the reduced data set. This time domain joint channel estimation 420 is feasible in practice because it is effectively performed on a subset of the N signal sources 100. In exemplary embodiments, the time domain joint channel estimation 420 is performed on a reduced data set 418 that includes the estimated contribution of only one of the signal sources 100. Optionally, as indicated in FIG. 4, an Inverse Fast Fourier Transform ("IFFT") 416 can be applied to the frequency domain reduced data set 414 so that the time domain joint channel estimation 420 is applied to a time domain data set 416. In other embodiments, the time domain channel estimation 420 is applied directly to the frequency domain reduced data set 414.

This process is repeated to obtain time domain estimates 422 for all of the N signal sources 100 and all of the α subcarriers 304. In general, the number of subcarriers 204 used by each of the signal sources 100 may vary. Accordingly, in embodiments the time domain channel estimation 420 is applied for each of the N signal sources 100 across only those subcarriers that are used by that signal source, which may be less than α.

Figure 5:
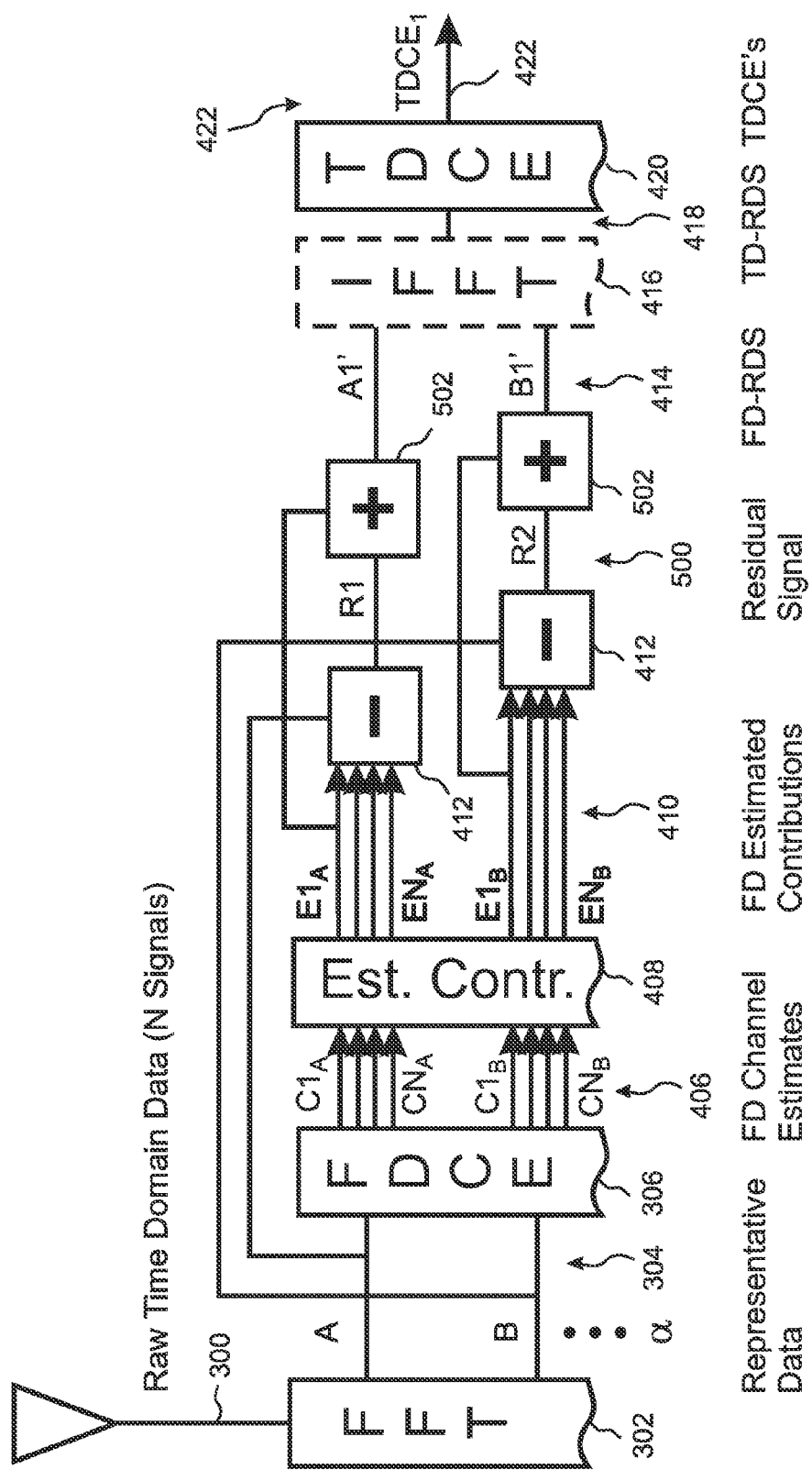
FIG. 5 is a block diagram of an embodiment similar to FIG. 4, wherein contributions from all of the users are subtracted from the received data, and then added back one-by-one before application of the time domain channel estimation.

With reference to FIG. 5, in embodiments the estimated contributions 410 of all of the signal sources 300 are subtracted 412 from the received reference symbol data 308 to obtain just the residual component 500 arising from noise and from differences between the estimated 410 and actual contributions. Then, one at a time, the estimated contributions 410 of the signal sources are added back 502 to the residual component 500 and the time domain channel estimation 420 is performed.

The subtraction 412 of the estimated contributions 410 can be performed in the frequency domain, as illustrated in FIGS. 4 and 5. As noted above, the time domain channel estimation 420 can then be applied either to the frequency domain reduced data set 414, or optionally an IFFT 416 can be applied to the frequency domain reduced data set 414 to obtain a time domain reduced data set 418, and the time domain channel estimation 420 can be applied to the time domain reduced data set. Alternatively, as illustrated in FIG. 6, if all of the signal sources 100 are using all of the subcarriers 304, so that the FFT 302 and the IFFT 416 are of the same size, then the subtraction 600 of the estimated contributions 408 can be performed in the time domain to obtain a time domain reduced data set. If necessary, an inverse Fourier transform 416 can be applied to the frequency domain contributions 410 in preparation for the subtraction 600.

The time domain channel estimates are calculated for each signal source 100 over the entire bandwidth used by that signal source 100, which may occupy all of the α subcarriers 304 in the received data 300 or a subset thereof. Typically, these bandwidths are larger than the bandwidths that are used to obtain the initial frequency domain channel estimates. This increase in the bandwidth increases the robustness of the residual interference, while the reduction in the number of signal sources included in the estimates computationally simplifies the calculation 420 of the time domain channel estimates 422 by reducing the number of unknowns to be solved for. Accordingly, the performance of the method is significantly improved as compared to frequency domain channel estimation 306.

Figure 7:
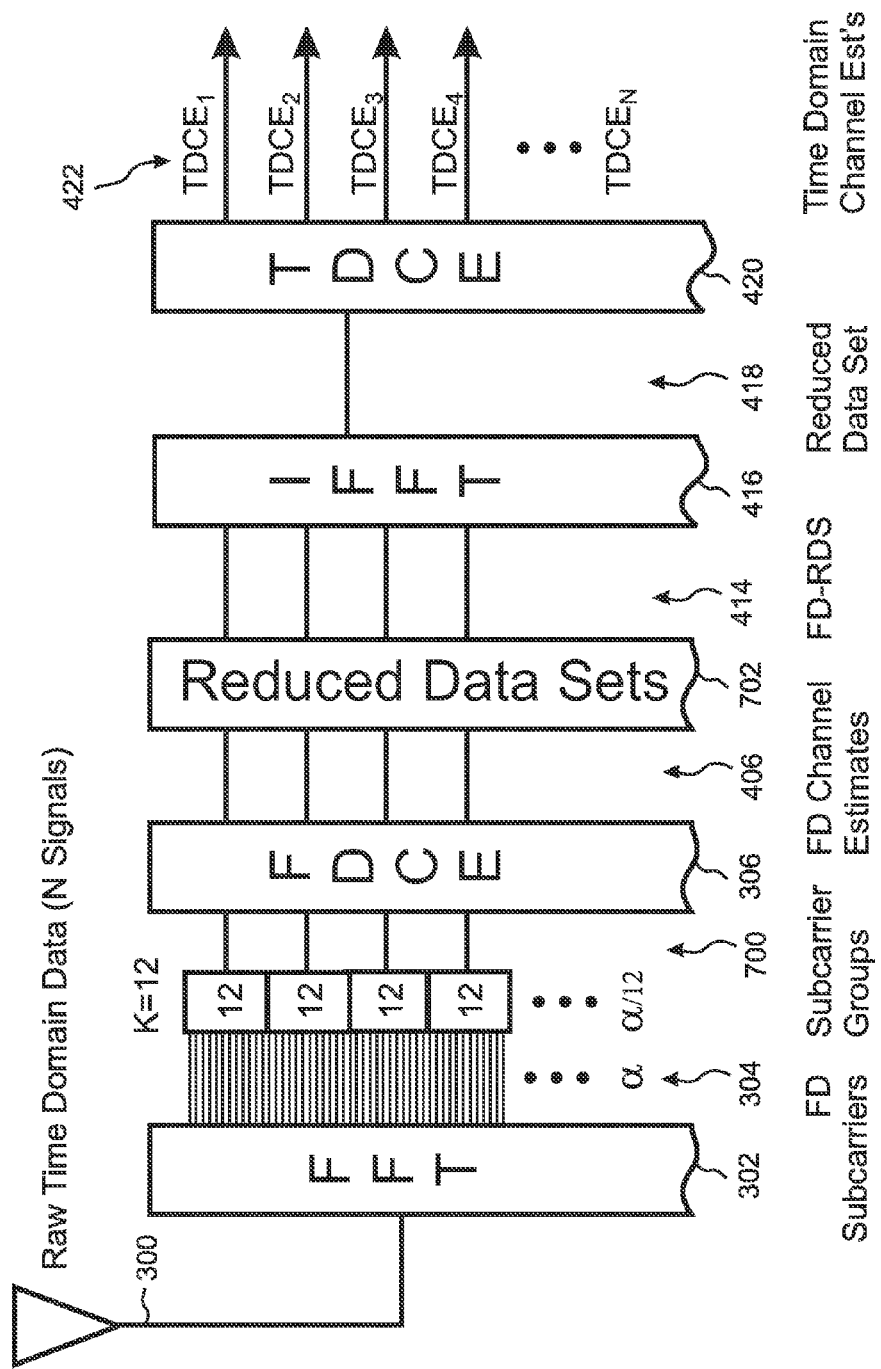
FIG. 7 is a block diagram of an embodiment similar to FIG. 4, wherein the subcarriers are grouped into subcarrier groups, and the disclosed method is applied to the subcarrier groups.

With reference to FIG. 7, in exemplary embodiments the number of reference symbol samples included in the frequency domain channel estimate calculations 306 is increased and the computational burden is decreased by dividing the subcarriers into subcarrier groups 700, each subcarrier group including K subcarriers 304, where K is an integer greater than or equal to 1, and by applying the joint frequency domain channel estimation 306 to these subcarrier groups 700, rather than separately to each subcarrier 304. In the embodiment of FIG. 7, K is equal to 12. For each group 700 of K subcarriers, a joint frequency domain channel estimate is calculated 306 for each of the N signal sources 100 that is transmitting over a subcarrier in that group 700. Note that the generation of the frequency domain reduced data set 414 from the frequency domain channel estimates 406 is summarized by a single item number 702 in FIG. 7. The steps included in item 702 will depend on the embodiment. For example, in the embodiment of FIG. 4, item 702 would encompass items 408, 410, and 412.

Figure 8:
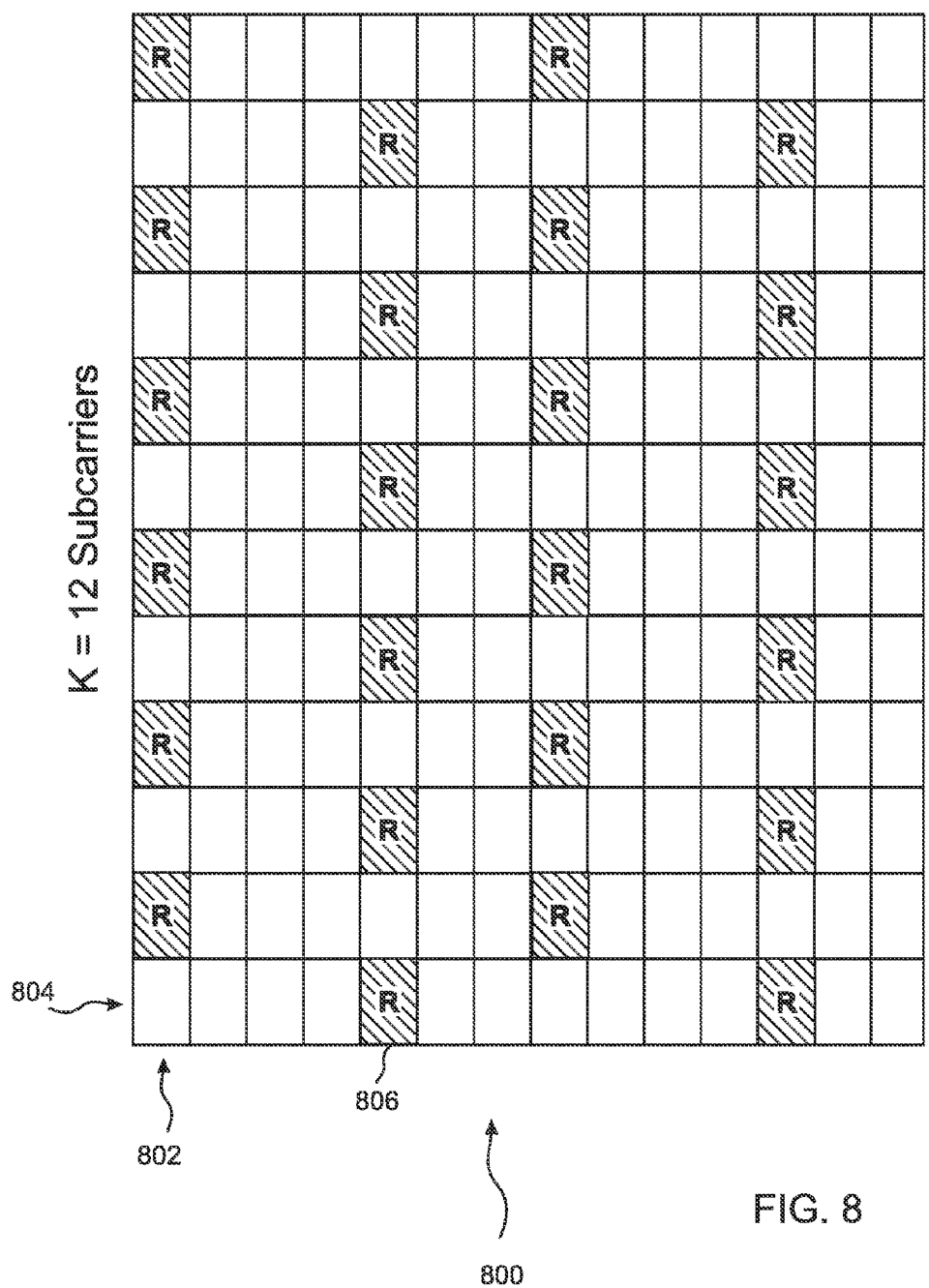
FIG. 8 is an illustration of a reference symbol sampling window containing K=12 subcarriers and β=2 reference symbols per subcarrier.

With reference to FIG. 8, in order to obtain the necessary dimensionality, in embodiments each of the frequency domain channel estimates 306 is calculated over a time/frequency "window" 800 extending over the K subcarriers 802 in a subcarrier group 700, and over a time-domain string of β reference symbols 804, so that the total number of reference samples 806 M included in the calculation is K×β, where K and β are both integers that are equal to or greater than 1. In the embodiment of FIG. 8, K=12, and β=2, so that M=24. M is typically greater than N by an amount that depends on how static the channel is in time and frequency, as well as characteristics of the correlations between the reference symbols and between the channels.

As described above, the initial, frequency domain channel estimates 406 are used to create a reduced data set by applying the frequency domain channel estimates 408 to the reference symbols 806 to calculate estimated contributions 410 of the signal sources, and then subtracting 412 one or more of the estimated contributions 410 (or fractions thereof) from the received signal in either the time or frequency domain. A time domain channel estimation technique 420 is then applied for each signal source 100 to either the frequency domain reduced data set 414 or the time domain reduced data set 418 across the entire bandwidth of that signal source, i.e. to all of the subcarriers 204 used by that signal source 100.

Figure 9:
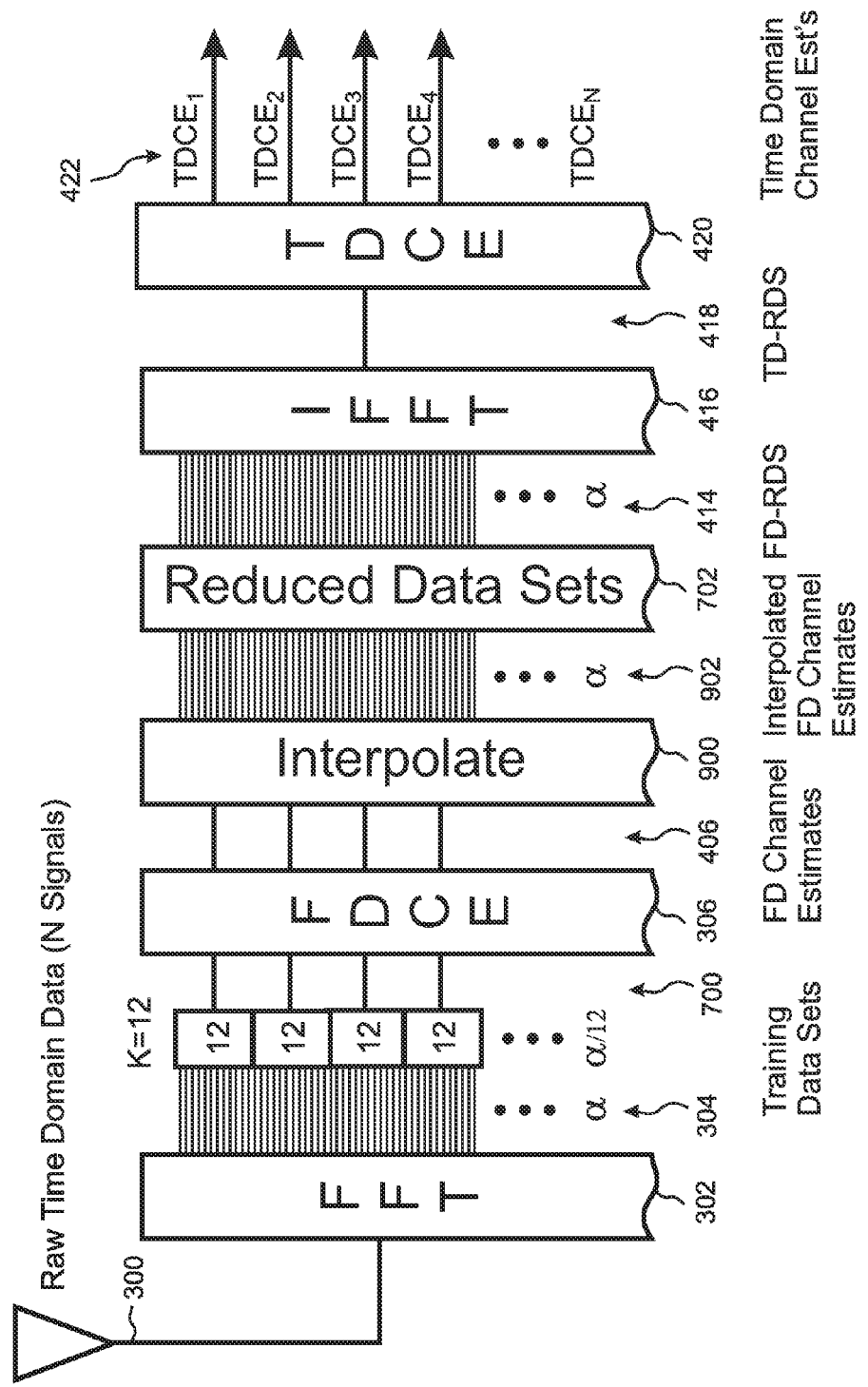
FIG. 9 is a block diagram of an embodiment similar to FIG. 7, wherein the frequency domain channel estimates are interpolated to obtain estimated contributions and time domain channel estimates for each of the subcarriers.

In the embodiment of FIG. 7, a joint frequency domain channel estimate is calculated for each β×K time/frequency window for each signal source 100 that contributes to that window. With reference to FIG. 9, since the channels are rarely static over these time/frequency windows, the channel estimates can be interpolated 900 so that the reduced data set can be calculated using estimated contributions 902 to each of the individual subcarriers. In the frequency domain, as illustrated in FIG. 9, the interpolation is calculated across the subcarrier groups. Similarly, in the time domain interpolation can be applied across successive reference symbols included in the time-domain strings of β reference symbols 804, or between time-domain strings by comparing the current string with the previous string and/or by comparing the current string with the next one if it is acceptable to wait until the next string is received.

Figure 10:
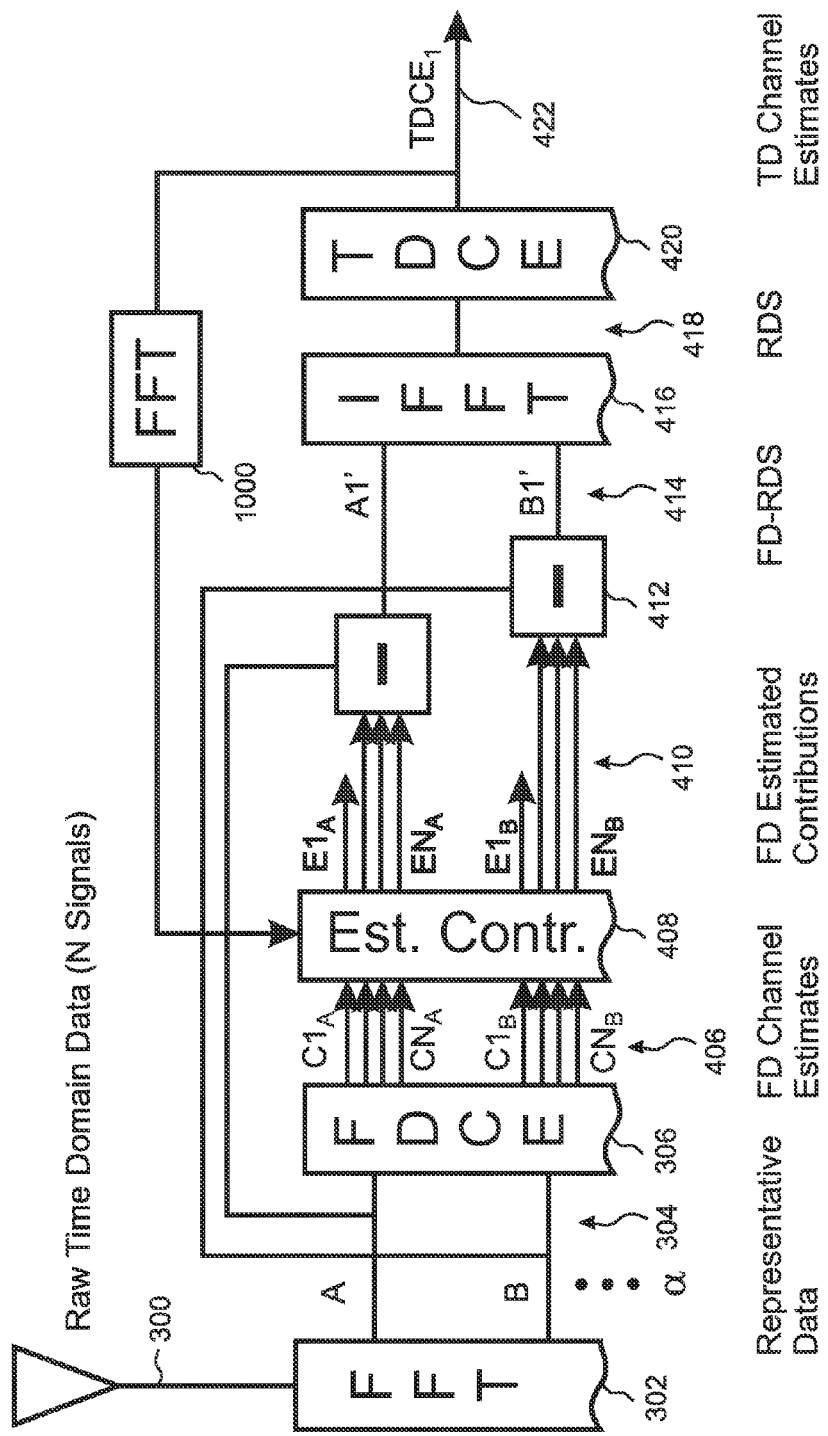
FIG. 10 is a block diagram of an embodiment similar to FIG. 4, wherein the method is repeated using the time domain channel estimates from the first repetition to calculate estimated contributions which are then used in the second repetition to obtain refined time domain channel estimates.

With reference to FIG. 10, in exemplary embodiments the disclosed method can be repeated, with each repetition generating a "revised" reduced data set based on the most recent time domain channel estimates. In FIG. 10, the time domain channel estimates 422 are converted to the frequency domain by a Fourier transform 1000 and used to calculate a revised set of estimated signal source contributions 410 in the frequency domain, which are then used to calculate the revised reduced data set 418. In similar embodiments, the time domain channel estimates 422 are used to calculate a revised set of estimated time domain frequency source contributions, which are then subtracted from the received time domain data set 300 in a manner similar to FIG. 6.

Figure 11:
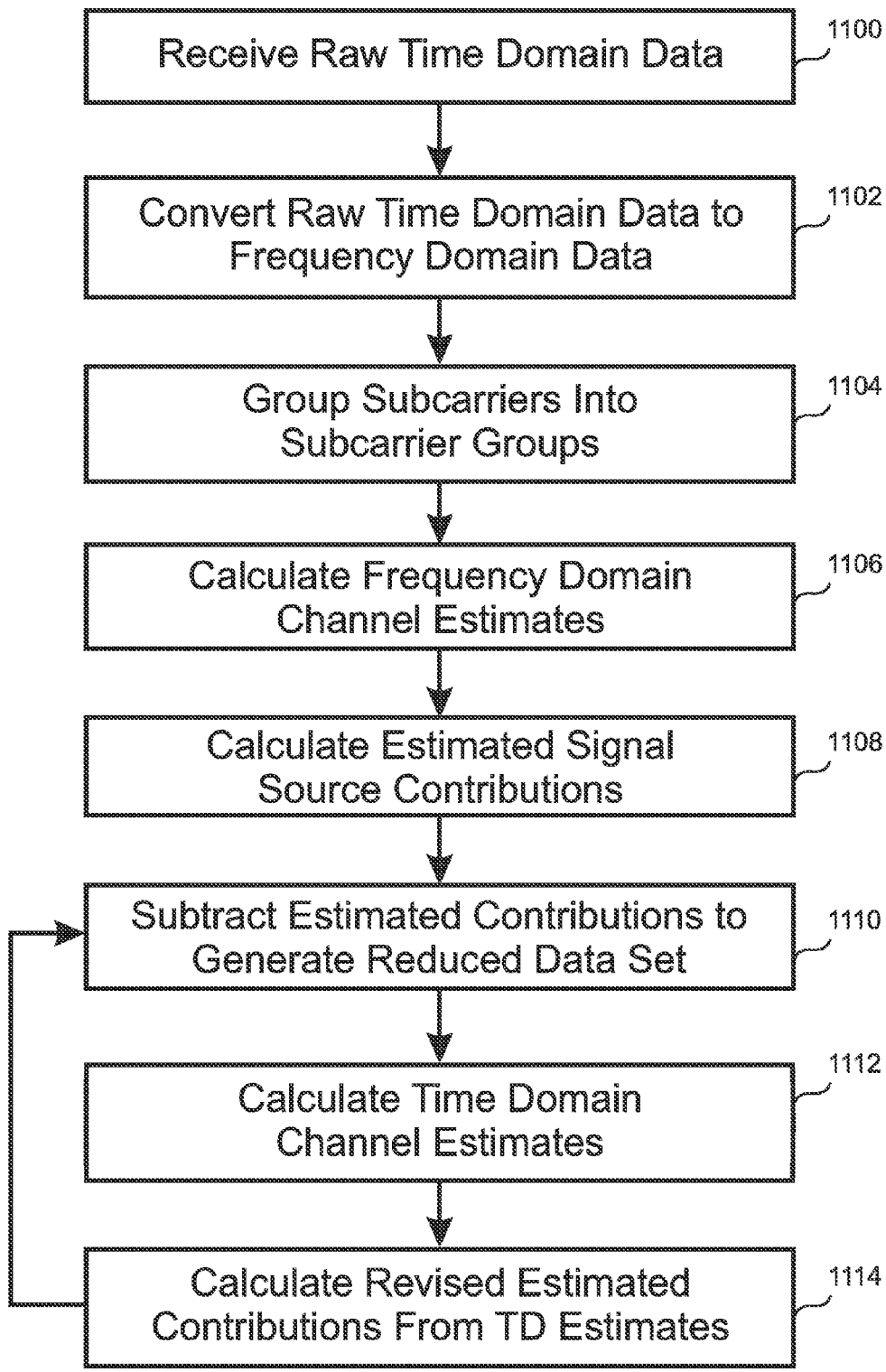
FIG. 11 is a flow diagram illustrating steps in an embodiment of the disclosed method.

FIG. 11 is a flow diagram that summarizes an embodiment of the present method. Raw time domain data is received 1100 and converted to frequency domain data 1102 that is distributed among frequency-separated subcarriers. The subcarriers are grouped into subcarrier groups 1104, and a frequency domain channel estimate is calculated 1106 for each signal source for each subcarrier group. These frequency domain channel estimates are used to calculate estimated contributions 1108 by each of the signal sources, and at least one of these contributions (or a fraction thereof) is subtracted from the received data 1110 in either the frequency or time domain to obtain a reduced data set. Finally, time domain channel estimates are calculated 1112 using the reduced data set. In one embodiment, the time domain channel estimates can then optionally be used to calculate revised estimates of the signal source contributions 1114, which can then be used to repeat the method and calculate revised time domain channel estimates.

As noted above, errors tend to arise in frequency domain channel estimation due to incomplete validity of the static assumption and/or because there is excess correlation of the reference symbols or the channels. The present method improves the channel estimation accuracy in exemplary embodiments because the time domain channel estimation can be applied to a larger bandwidth, which has different correlation properties for both the reference symbols and for the channels. This approach exploits the natural de-correlation that tends to exist between sequences with larger bandwidths, especially if the reference sequences have less correlation over larger bandwidths.

In some embodiments the raw data 300 can be discontinuous in frequency, such as when the signals 102 do not occupy all of the available subcarriers 204. In some of these embodiments, the disclosed method operates as described above, except that only the active subcarriers are included in the subcarrier groups 700.

In other embodiments, the raw data 300 is discontinuous in time, and the disclosed method is adapted such that the time/frequency sampling "windows" 800 only encompass intervals of time when the data is present.

In various embodiments, the time domain channel estimates and/or the frequency domain channel estimates employ linear estimation techniques such as a least squares or minimum mean square error estimation algorithm. Other embodiments employ any linear or nonlinear estimation method known in the art.

Embodiments of the disclosed method can be applied to raw data transmitted in a Long Term Evolution (LTE) communication system uplink, which contains 1 demodulation reference symbol 806 every 500 microsecond "slot" (=½ sub-frame) that spans the entire bandwidth of a single time symbol. A static channel assumption can be made across a time/frequency window 800 that spans many subcarriers 802, and possibly multiple 500 microsecond slots 804, depending on the particular channel environments. The validity of the static assumption in the time domain is affected mainly by the speed at which the signal sources 100 and receivers 104 are moving, and the reflectors and angle of incidence in the transmission paths. The validity of the static assumption in the frequency domain is mainly affected by the channel length, as well as the locations and powers present in each channel tap.

With reference again to FIG. 8, suppose in a particular LTE example that the static assumption is sufficiently valid over 180 kHz of bandwidth (12 subcarriers) 802 and 1 millisecond of time (two slots) 804. The LTE uplink then provides 24 samples of reference symbols 806 for each time/frequency window 800 of 2 slots×12 subcarriers (1 ms×180 kHz). The joint channel estimations performed over these 24 sample windows 806 can be used to estimate channels for N signal sources 100, where N is less than 24. For example, a realistic scenario would be N equals 20 or less. In some cases, it can be necessary that N equals 12 or less.

According to a representative example, a joint frequency domain least squares channel estimation can be performed for each time/frequency estimation window 800 of 12 subcarriers×2 slots on raw data representing up to 20 signal sources. This will produce a single frequency domain channel estimate for each of the 20 signals in each sampling window. These frequency domain channel estimates can then be interpolated 900 across the frequency band to obtain a separate frequency domain channel estimate for each subcarrier 304.

With reference again to FIG. 7, a reduced data set 702 can be calculated for each individual signal source 100, suppressing signals from all of the other signal sources and creating a reduced data set 414 that represents only the signal from the selected signal source, plus noise and residual signal from channel estimation errors. The reduced data set 414 can then be used to calculate a time domain least square channel estimate 420 for each of these signal source contributions. Based on the bandwidth assigned to a signal, multiple time domain taps can be hypothesized and the corresponding channel estimates can be computed.

Figure 12:
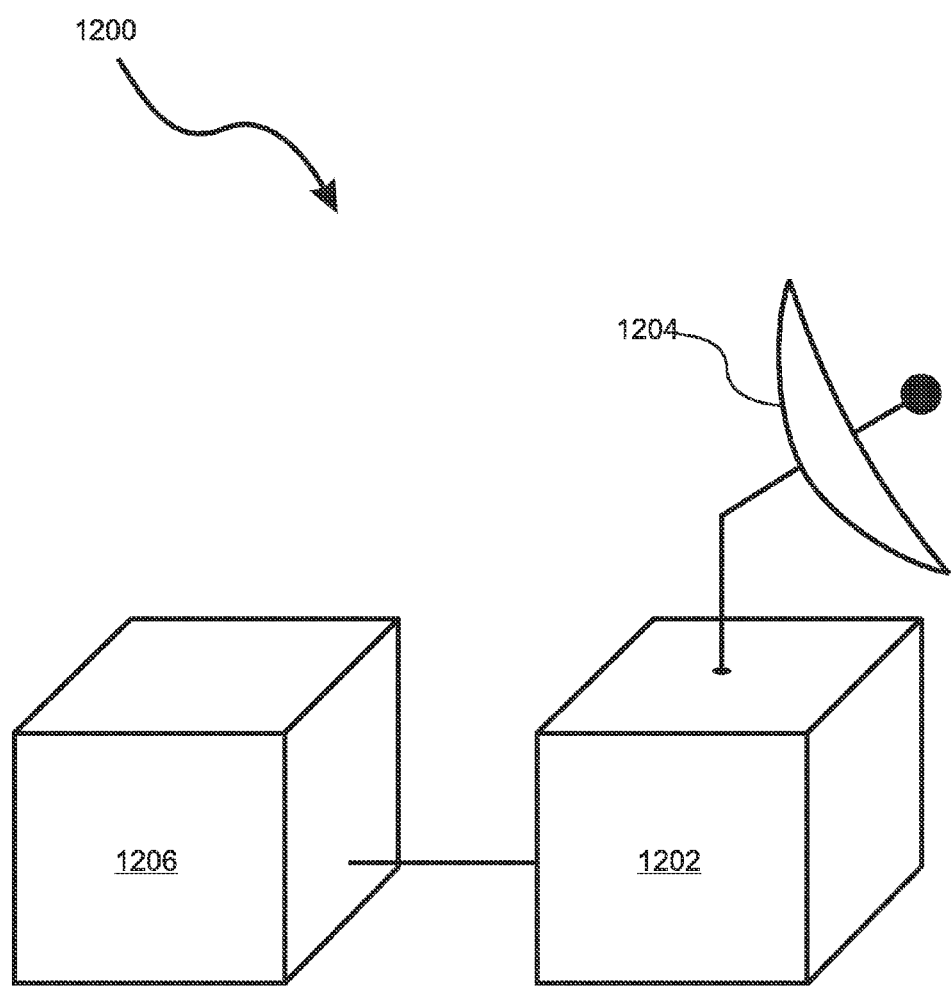
FIG. 12 is a block diagram illustrating an embodiment of the disclosed system.

With reference to FIG. 12, the system disclosed herein 1200 includes a signal receiving unit 1202 in communication with at least one antenna 1204 and configured to receive raw data from a plurality of signal sources 100, and a signal processing unit 1206 that performs the FFT and IFFT calculations, frequency domain channel estimations, interpolations, signal contribution estimations, time domain channel estimations, and other data processing functions.

The signal processing unit 1206 is an instruction execution machine, apparatus, or device, and may comprise one or more of a microprocessor, a digital signal processor, a graphics processing unit, an application specific integrated circuit (ASIC), a field programmable gate array (FPGA), and the like. The signal processing unit 1206 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide non-volatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The signal processing unit 1206 and signal receiving unit 1202 preferably detect and analyze transmissions from at least one or more remote nodes 100 that operate in a networked environment using logical connections to one or more base stations ("BS's") 104. The remote node 100 may be another BS, a user equipment ("UE"), a computer, a server, a router, a peer device or other common network node. The base station 104 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, signal processing unit 306 may include logic configured to support direct memory access (DMA) transfers between memory and other devices.

It should be understood that the arrangement illustrated in FIG. 12 is but one possible implementation, and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 1200. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 12. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter disclosed, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method of obtaining channel estimates for a frequency-multiplexed data transmission, the method comprising:
    receiving, by a receiver unit in wireless communication network, raw time domain data representing a plurality of known reference symbols transmitted over a plurality of frequency-separated subcarriers by a plurality of signal sources;
    by a signal processing unit:
        converting said raw time domain data into frequency domain data;
        grouping said subcarriers into subcarrier groups, each subcarrier group including K subcarriers, where K is an integer greater than or equal to 1;
        using the frequency domain data to jointly calculate frequency domain channel estimates for each of the subcarrier groups and signal sources;
        generating a reduced data set by subtracting from representative data derived from said raw time domain data an estimated contribution arising from at least one of the signal sources according to the frequency domain channel estimates; and
        calculating time domain channel estimates from the reduced data set.

2. The method of claim 1, wherein K is greater than 1.

3. The method of claim 2, wherein the K subcarriers in each subcarrier group are frequency contiguous.

4. The method of claim 2, wherein the method further comprises applying at least one of interpolation and filtering to the frequency domain channel estimates to obtain frequency domain channel estimates for groups of J subcarriers, where J is an integer less than K.

5. The method of claim 1, wherein calculating the joint frequency domain channel estimates includes applying at least one of a least squares algorithm, a minimum mean square error algorithm, a recursive least squares algorithm, a Kalman filter, and an extended Kalman filter.

6. The method of claim 1, wherein calculating the time domain channel estimates includes applying at least one of a least squares algorithm, a minimum mean square error algorithm, a recursive least squares algorithm, a Kalman filter, and an extended Kalman filter.

7. The method of claim 1, wherein the time domain channel estimates are calculated across the entire bandwidth of the frequency-multiplexed transmission.

8. The method of claim 1, wherein generating the reduced data set includes subtracting from the representative data the estimated contributions arising from all of the signal sources, so that only a residual signal and noise remains, and then re-adding at least one of the estimated contributions to the residual signal and noise.

9. The method of claim 1, wherein the reduced data set is generated by subtracting from said frequency domain data an estimated contribution arising from at least one of the signal sources according to the frequency domain channel estimates to create a reduced frequency domain data set, and then converting the reduced frequency domain data set into the reduced data set.

10. The method of claim 1, wherein the reduced data set is generated by subtracting from said raw time domain data an estimated time domain contribution arising from at least one of the signal sources according to the frequency domain channel estimates.

11. The method of claim 1, further comprising:
    generating a revised reduced data set by subtracting from said representative data an estimated contribution arising from at least one of the signal sources according to the time domain channel estimates; and
    calculating revised time domain or frequency domain channel estimates from the revised reduced data set.

12. The method of claim 1, wherein the raw time domain data spans an entire bandwidth of a plurality of known reference symbols.

13. The method of claim 1, wherein the signal sources communicate according to LTE protocols.

14. The method of claim 1, wherein the raw time domain data is encoded as OFDM or SC-FDMA data.

15. A system for obtaining channel estimates for a frequency-multiplexed data transmission, the system comprising:
    a receiver unit configured to receive raw time domain data representing a plurality of known reference symbols transmitted over a plurality of frequency-separated subcarriers by a plurality of signal sources; and
    a signal processing unit configured to convert said raw time domain data into frequency domain data, group said subcarriers into subcarrier groups, each subcarrier group including K subcarriers, where K is an integer greater than or equal to 1, use the frequency domain data to jointly calculate frequency domain channel estimates for each of the subcarrier groups and signal sources, generate a reduced data set by subtracting from representative data derived from said raw time domain data an estimated contribution arising from at least one of the signal sources according to the frequency domain channel estimates, and calculate time domain channel estimates from the reduced data set.

16. The system of claim 15, wherein K is greater than 1.

17. The system of claim 16, wherein the K subcarriers in each subcarrier group are frequency contiguous.

18. The system of claim 16, wherein the signal processing unit is configured to apply at least one of interpolation and filtering to the frequency domain channel estimates to obtain frequency domain channel estimates for groups of J subcarriers, where J is an integer less than K.

19. The system of claim 15, wherein the signal processing unit is configured to apply at least one of a least squares algorithm, a minimum mean square error algorithm, a recursive least squares algorithm, a Kalman filter, and an extended Kalman filter when calculating the joint frequency domain channel estimates.

20. The system of claim 15, wherein the signal processing unit is configured to apply at least one of a least squares algorithm, a minimum mean square error algorithm, a recursive least squares algorithm, a Kalman filter, and an extended Kalman filter when calculating the time domain channel estimates.

21. The system of claim 15, wherein the signal processing unit is configured to calculate the time domain channel estimates across the entire bandwidth of the frequency-multiplexed transmission.

22. The system of claim 15, wherein the signal processing unit is configured to subtract from the representative data the estimated contributions arising from all of the signal sources, so that only a residual signal and noise remains, and then re-add at least one of the estimated contributions to the residual signal and noise so as to generate the reduced data set.

23. The system of claim 15, wherein the signal processing unit is configured to generate the reduced data set by subtracting from said frequency domain data an estimated contribution arising from at least one of the signal sources according to the frequency domain channel estimates to create a reduced frequency domain data set, and then converting the reduced frequency domain data set into the reduced data set.

24. The system of claim 15, wherein the signal processing unit is configured to generate the reduced data set by subtracting from said raw time domain data an estimated contribution arising from at least one of the signal sources according to the frequency domain channel estimates.

25. The system of claim 15, wherein the signal processing unit is further configured to:
generate a revised reduced data set by subtracting from said representative data an estimated contribution arising from at least one of the signal sources according to the time domain channel estimates; and
calculate revised time domain or frequency domain channel estimates from the revised reduced data set.

26. The system of claim 15, wherein the receiver unit is configured to receive raw time domain data that spans an entire bandwidth of a plurality of known reference symbols.

27. The system of claim 15, wherein the receiver unit is configured to receive raw time domain data from signal sources that communicate according to LTE protocols.

28. The system of claim 15, wherein the receiver unit is configured to receive raw time domain data that is encoded as OFDM or SC-FDMA data.

29. A non-transitory computer readable medium storing a computer program, executable by a machine, for obtaining channel estimates for a frequency-multiplexed data transmission, the computer program comprising executable instructions for:
receiving raw time domain data representing a plurality of known reference symbols transmitted over a plurality of frequency-separated subcarriers by a plurality of signal sources;
converting said raw time domain data into frequency domain data;
grouping said subcarriers into subcarrier groups, each subcarrier group including K subcarriers, where K is an integer greater than or equal to 1;
using the frequency domain data to jointly calculate frequency domain channel estimates for each of the subcarrier groups and signal sources;
generating a reduced data set by subtracting from representative data derived from said raw time domain data an estimated contribution arising from at least one of the signal sources according to the frequency domain channel estimates; and
calculating time domain channel estimates from the reduced data set.

30. The method of claim 1, wherein subtracting an estimated contribution arising from at least one of the signal sources includes subtracting a fractional contribution arising from at least one of the signal sources from said raw time domain data.

* * * * *